Nov. 28, 1950 J. J. SLOMER Re. 23,300

CABLE REEL

Original Filed May 12, 1944 2 Sheets-Sheet 1

INVENTOR
Joseph J. Slomer
Clarence F. Poole
ATTORNEY

CABLE REEL

Original Filed May 12, 1944 2 Sheets-Sheet 2

INVENTOR
Joseph J. Slomer
Clarence J. Poole
ATTORNEY

Reissued Nov. 28, 1950 Re. 23,300

UNITED STATES PATENT OFFICE 23,300

CABLE REEL

Joseph J. Slomer, Chicago, Ill., assignor to Goodman Manufacturing Company, Chicago, Ill., a corporation of Illinois Original No. 2,395,302, dated February 19, 1946, Serial No. 535,245, May 12, 1944. Reissue No. 23,099, dated April 12, 1949, Serial No. 51,941, September 30, 1948. This application for reissue May 6, 1950, Serial No. 160,479

21 Claims. (Cl. 242—90)

This invention relates to improvements in cable reels particularly adapted for use on mine locomotives and more particularly relates to a fluid motor drive for a cable reel adapted to supply power to a moving vehicle such as a mine locomotive of the gathering type.

Heretofore mine locomotives of the gathering type have been supplied with power when beyond the power line by means of an electric cable wound on or payed off of a reel, which is driven directly from an electric motor. This motor is usually of the series type so it will pick up cable as the speed of the locomotive increases and tension on the cable decreases, and is usually directly connected with a cable reel and maintains tension on the cable during the unwinding operation when the locomotive is moving away from the source of power, said motor being driven by the cable reel as a generator during unwinding. Various forms of means have been provided to cut a resistance into or out of the cable reel drive motor circuit during the winding and unwinding operations, and when the locomotive is stalled, in order to maintain substantially the same tension on the cable when completely wound on its drum as when partially wound on its drum and during unwinding and stalling of the locomotive. Such switching arrangements have never been entirely satisfactory, chiefly because the switching means must be mechanically operated and no switching means has yet been devised which is responsive to the torque on the winding drum, to cut a resistance into or out of the motor circuit.

The principal objects of my present invention are to provide a fluid motor drive to a cable reel for a mine locomotive, so arranged that the volume of fluid supplied to the motor for the cable reel will be automatically increased as the torque on the winding drum decreases and will be automatically decreased as the torque on the winding drum increases.

Still another object is to enable a fluid motor to drive cable reel of a mine vehicle and to be driven as a pump in the reverse direction during unreeling of the cable and to maintain a back pressure on the motor when acting as a pump, the amount of such back pressure being controlled by a valve having a movable valve member therein shiftable in response to such change in operation of the fluid motor to maintain proper tension on the cable at a desired value during the unreeling operation.

A further object of my invention is to provide a fluid motor drive to the cable reel of a mine locomotive wherein the fluid motor is driven as a pump during the unwinding operation and maintains tension on the cable during unwinding and stalling of the locomotive, and to so arrange the fluid connections that said fluid motor may be driven as a pump without stopping operation of the pump which supplies fluid under pressure to said motor.

Other objects of my invention will appear from time to time as the following specification proceeds and with reference to the accompanying drawings wherein.

Figure 1:
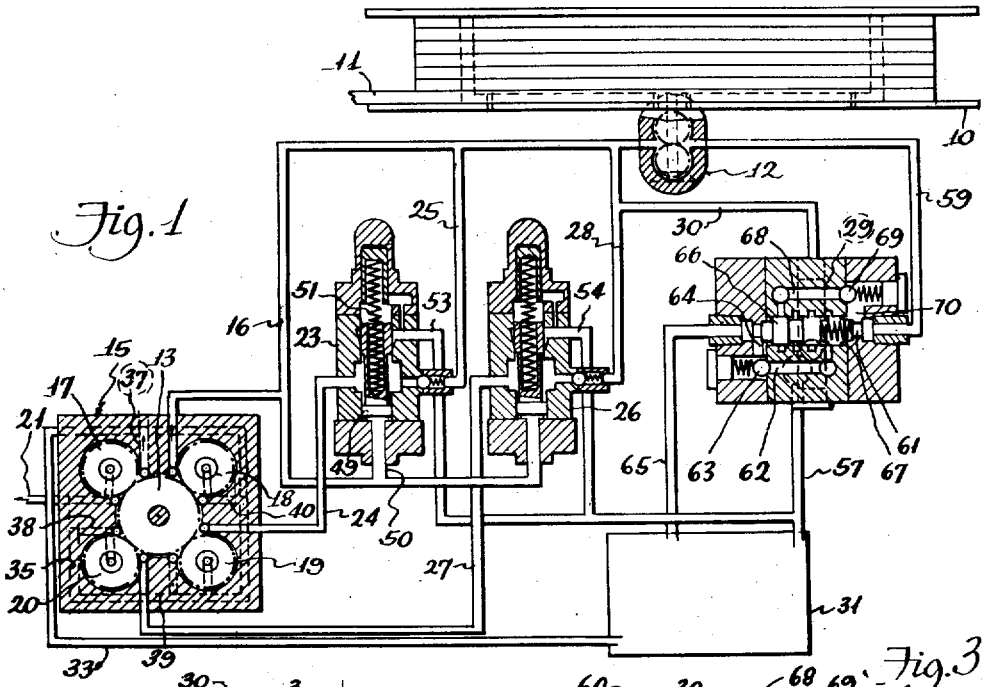
Figure 1 is a diagrammatic view illustrating a form of fluid circuit arranged in accordance with my invention, for driving a fluid motor operatively connected with a cable reel.

In Figure 1 of the drawings, a cable reel 10 is shown as having an electric cable wound thereon. The cable 11 is adapted to be connected at its free end to a source of electric power, to supply electric power to a vehicle, such as an electric locomotive, moving towards or from said source of power. Said cable reel may be of any well known construction and is no part of my present invention, so will not herein be shown or described in detail. A fluid motor 12 is provided to rotatably drive said reel and may be directly connected thereto as by a bevel gear reduction. Said motor is herein shown as being a well known form of gear motor, and is no part of my present invention so is not shown in detail. A fluid pump 15, driven by a suitable motor (not shown), is provided to supply fluid under pressure to said fluid motor 12 through a pressure line 18. Said pump, as herein shown, is of a multiple gear type including a central rotor 13 having driving connection with four gears 17, 18, 19 and 20, each of which gears with said rotor serves as an individual pump, to supply fluid to the pressure line 16 at a definite volume.

The gear and pump 17 may have connection with a pressure line 21 which may be connected with the hydraulic brakes of the locomotive, for supplying fluid under pressure thereto. The gear and pump 18 is directly connected with the pressure line 16 for supplying fluid under pressure thereto and to the fluid motor 12. The gear and pump 19 is connected with a relief valve 23 by a pipe 24 and is connected from said relief valve to the pressure line 16 by a pipe 25, to supply fluid to said pressure line through said relief valve. The gear and pump 20 is connected to a relief valve 26 by means of a pipe 27, and is connected from said relief valve to the pressure line 16 by means of a pressure line 28.

Figure 3:
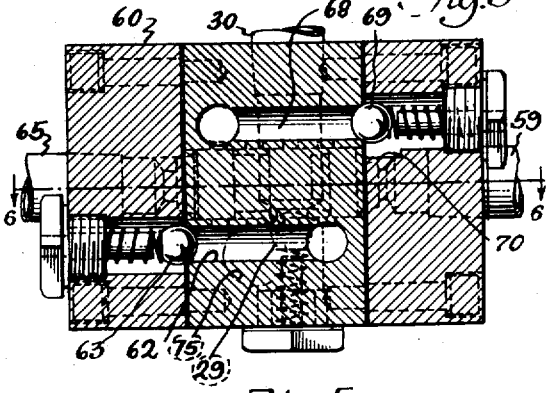
Figure 3 is a section view taken substantially along line 3—3 of Figure 2.
Figure 4:
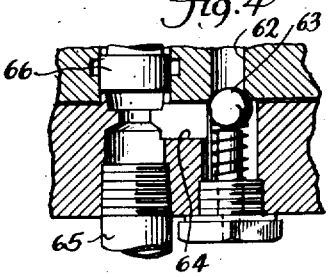
Figure 4 is an enlarged detail sectional view showing certain details of the valve shown in Figure 2.

The pump 18 is provided to supply fluid at a definite pressure and volume to the motor 12, to drive said motor. Pressure is relieved from said pump and the pressure line 16 through a relief valve 29, connected with said pressure line by means of a pipe 30 (see (Figures 1 and 3). When the pump 19 is connected in the pressure line 16, the volume of fluid supplied to the motor 12 is increased a predetermined amount, and when the pump 20 is connected in the pressure line 16, the volume of fluid supplied to the fluid motor 12 will be increased a further amount, to increase the speed of said motor, so said motor may drive the cable reel 10 at a speed sufficient to maintain tension on and pick up the cable 11, as the speed of travel of the locomotive increases.

Figure 7:
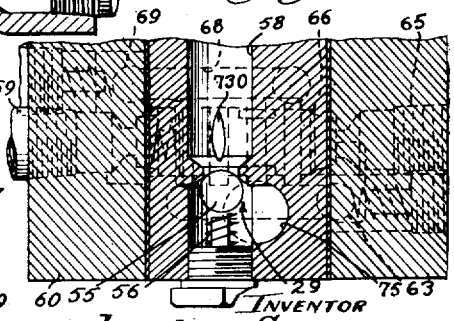
Figure 7 is a sectional view taken substantially along line 7—7 of Figure 2.
Figure 6:
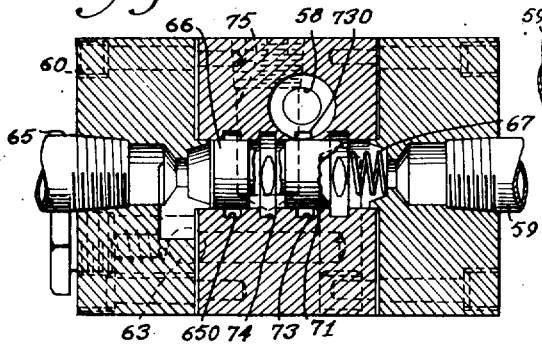
Figure 6 is a sectional view taken substantially along line 6—6 of Figure 3.

The intake side of the pump 15 is connected with a fluid storage tank 31 by means of a pipe 33. A passageway 35 formed in a housing 36 for said pump is connected with said intake pipe and is formed to traverse a rectangular path around said housing to supply fluid to each of the pumps 17, 18, 19 and 20. A passageway 37 connects said passageway 35 with the inlet port of the pump 17, to supply fluid thereto, while passageways 40, 39 and 38 connect said passageway 35 with the inlet ports of the pumps 18, 19 and 20, respectively, to supply fluid thereto. A separate relief valve 42 is provided in said housing for each pump, to relieve excess pressures therefrom. The relief valve 42 for the pump 19 includes a ball 43 adapted to close a passageway 44 leading from outlet port of said pump. Said ball is held in its seat by means of a spring 45 seated on said ball at one of its ends and seated at its opposite end within a hollow plug 46, threaded in said housing. When the pressure in the outlet side of the pump exceeds a predetermined value, determined by the spring 45, the ball 43 will be unseated, to permit fluid to flow by said ball through a passageway 47 to the intake passageway 35, as shown in Figure 7. The details of the connections from each relief valve to each pump are not herein shown or described, since the connection from one pump to its relief valve is substantially the same as that of another pump to its relief valve, and the particular arrangement of said relief valves and their connections to their associated pumps are no part of my present invention.

When the pump 15 is operating and the locomotive is moving towards its source of power, fluid will be supplied to the pressure line 16 by means of the pumps 18, 19 and 20, to wind cable on the reel at a speed sufficient to take up all slack from the cable 11, fluid passing from the pumps 19 and 20 to said pressure line through the respective relief valves 23 and 26. This will supply a maximum volume of fluid to the motor 12. As slack of the cable is taken up and the torque of the motor 12 and tension on the cable 11 exceed that required to pick up the cable, fluid at the pressure of fluid in the pressure line 16 will be transmitted to a valve pistion 49 of the relief valve 23, through a pipe 50, to move said valve piston against a spring 51 and open said valve to the return through a pipe 53. This will by-pass part of the volume of fluid supplied to the fluid motor 12 and decrease the speed of rotation thereof. As the pressure in the line 16 again increases, the valve 26 will open to the return through a pipe 54, to further by-pass part of the volume of fluid supplied to the motor 12. As the locomotive speeds up and tension on the cable 11 is decreased, the relief valve 26 will first close the return through the pipe 54, and the relief valve 23 will then close the return through the pipe 53, to increase the volume of fluid supplied to said fluid motor and to increase the speed thereof in accordance with the speed of travel of the locomotive.

It should here be understood that during the winding operation the pump 18 may supply fluid to the motor 12 by itself, or the pumps 18 and 20 may supply fluid to said motor, or the pumps 18, 19 and 20 may supply fluid to said motor, and that said pumps will be continuously cut into or out of the pressure line 16 depending upon the tension of the cable 11. The valve 29 may be set to permit the pump 18 to exert a pressure of 500 pounds per square inch on the line 16, while the spring 51 of the valve 23 may be set to cut the pump 19 out of the fluid circuit when the pressure in said line 16 reaches 300 pounds per square inch, and the spring of the valve 26 may be set to cut the pump 20 out of the fluid circuit when the pressure in said line reaches 400 pounds per square inch. It should further be understood that any number of pumps and relief valves may be provided to more evenly graduate the steps of increase or decrease in tension of the cable, if desired, three pumps being shown herein for the purpose of simplicity.

Figure 2:
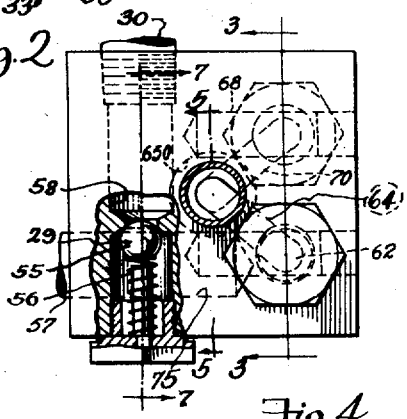
Figure 2 is an enlarged end view of the relief valve shown in Figure 1, with certain parts broken away and certain other parts shown in section.

The valve 29, for holding pressure on the line 16 and relieving pressure therefrom when the pressure therein reaches a predetermined value, as for instance, 500 pounds per square inch, is herein shown as being a ball type check valve including a ball 55 held against a seat by a spring 56, to close a passage 58 until a predetermined pressure is exerted against said ball by fluid in said passage (see Figure 2). The discharge side of said valve communicates with a passage 75 communicating with a return line 57, connected with the fluid storage tank 31. It should here be understood that when pressure held in the line 16 by the relief valve 29 is at a maximum value, the relief valves 23 and 26 will by-pass fluid from the pumps 19 and 20 to the fluid storage tank 31 and thus reduce the volume of fluid supplied to the reel 10.

When the motor 12 is driving the cable reel 10, fluid will be returned from said motor to the tank 31 through a pipe 59, connected to a valve block 60, which has the valve 29 mounted therein. During normal operation of said motor, fluid will pass through said pipe to and through said valve block, through a passageway 61 in said valve block, to and through a passageway 62 in said valve block, past a check valve 63, herein shown as being of the ball type, through a passageway 64 and out said valve block to the tank 31, through a pipe 65.

Figure 5:
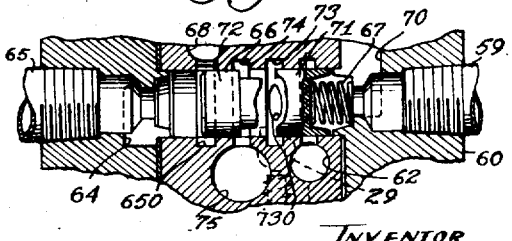
Figure 5 is a sectional view taken substantially along line 5—5 of Figure 2.
Figure 8:
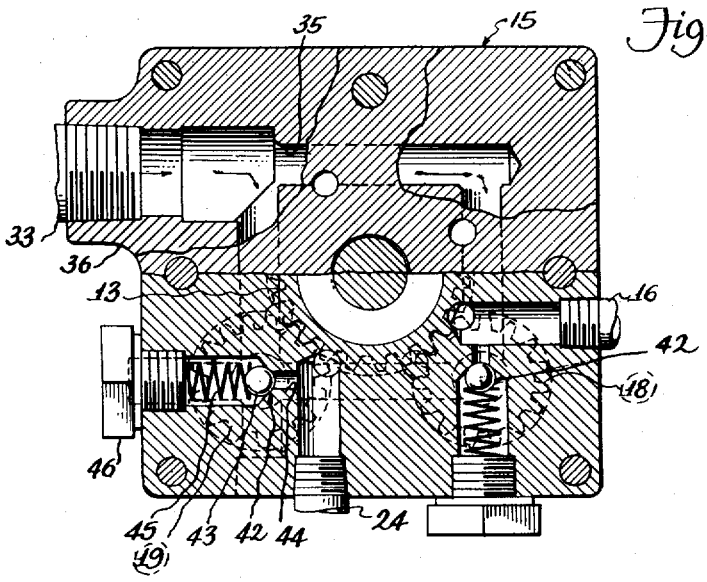
Figure 8 is an enlarged detail sectional view of the fluid pump shown in Figure 1.
Figure 9:
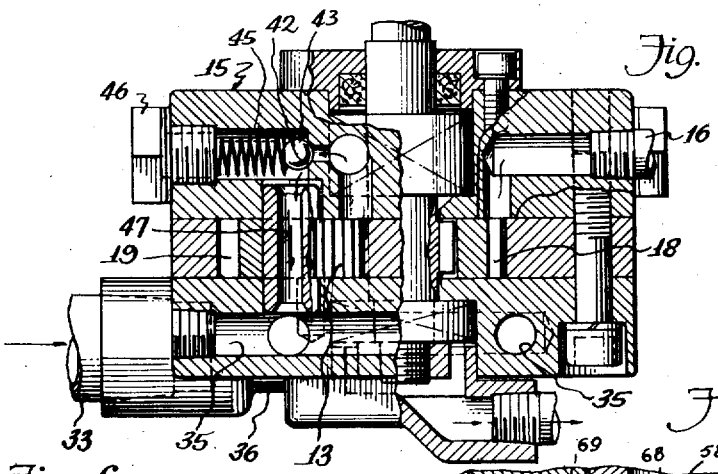
Figure 9 is a horizontal sectional view of the pump shown in Figure 1 showing certain details thereof not shown in Figure 8.

During the unwinding operation, when the locomotive is moving away from its source of power, the cable 11 being payed off of the cable reel 10 will drive the motor 12 as a pump. When said motor is driven as a pump, a suction will be created through the pipe 59. This will open a piston valve 66 in the valve block 60 against a spring 67 (see Figure 5). When said valve is open, fluid will pass from the pipe 65 through a groove 650 formed in the block for the valve 66, to and through a passageway 68 in said valve block. From thence fluid will pass by a check valve 69 and through a passageway 70 to said motor through the pipe 59 (see Figure 3). Opening of said valve 66 effected by suction in the pipe 59 will cause a land 71 of said valve to move to a position to permit fluid to pass from the passage 58, which intersects and communicates with a groove 73 in the valve block 60, as indicated by reference character 730. From said groove 73 fluid will pass in the spaced formed between the land 71 and a land 72 of said valve, to a groove 74 formed in said valve block. Said groove 74 intersects and communicates with the passageway 75 in said valve, which is connected with the release side of the check valve 29 and to the tank 31 by the return pipe 57, to by-pass fluid past the valve 29 (see Figure 5). The motor 12 driven as a pump by the cable 11 will thus suck fluid from the storage tank 31 through the valve 69 and pipe 59, and will return fluid to said storage tank through the pipe 30, valve 66, passageway 75 and pipe 57. It should be understood that when said motor 12 is being driven as a pump, the pumps 18, 19 and 20 are in operation, and that pressure in the line 16 has dropped an amount sufficient to connect the pumps 19 and 20 in the fluid system with the pump 18. When said motor 12 is operating as a pump, the output from the pumps 18, 19 and 20 and output from the motor 12 is passed through the relief valve 29 and takes a path through the pipe 30, passageway 58, past the orifice 730 formed by the intersection of passageway 58 with the groove 73, past the valve 66, past the groove 74 formed in the valve block 60 into passageway 75 and out the return pipe 57 to the tank 31. The restriction afforded by the orifice 730 and the restrictions afforded by the passageways and grooves of the valve block 60 cause back pressure to be exerted on the fluid motor 12, which is sufficient to maintain tension on the cable 11 and prevent the cable 11 from freely unwinding.

It may be seen from the foregoing that the locomotive is moving towards its source of power and tension on the cable 11 is relatively high, that the pump 18 will supply fluid to drive the motor 12 and that as the speed of travel of the locomotive increases, to tend to form slack in the cable 11, the pumps 19 and 20 will be progressively cut into the fluid circuit, to supply fluid to drive the motor 12 and increase its speed, and the speed of winding of the cable reel 10. As the cable reel catches up, to maintain tension on the cable 11, the pump 19 will first be cut out by the relief valve 23. The pump 20 will then be cut out by the relief valve 26, to further reduce the volume of fluid supplied to the motor 12 and reduce the speed of the winding drum 10 to correspond with the speed of travel of the locomotive, said pumps being cut into the fluid circuit to said motor 12, to increase the volume of fluid supplied to said motor and increase the speed of winding of the reel 10 to the speed required to pick up its cable and maintain tension thereon, as the speed of travel of the locomotive towards its source of power increases. It may further be seen that when the direction of travel of the vehicle is reversed, that the motor 12 is driven by the cable reel as a pump and that the pumps 18, 19 and 20 together with the restrictions afforded by the orifice 730 and the passageways and grooves in the valve block 60 serve to exert sufficient back pressure against the motor 12, when driven as a pump in unreeling of the cable 11, to prevent free unwinding of the cable reel 10, and to maintain tension on the cable 11.

When the locomotive is in a stationary position on the track and the cable 11 is connected to the source of power, the pump 18 will supply fluid to the motor 12, to tend to drive said motor and the cable reel 10 and to maintain tension on the cable 11, it being understood that fluid is by-passed from said motor to the tank 31 through the valve 29 and return pipe 57, when a predetermined pressure is reached in the pressure line 16.

While I have herein shown and described one form in which my invention may be embodied, it will be understood that the construction thereof and the arrangement of the various parts may be altered without departing from the spirit and scope thereof. Furthermore, I do not wish to be construed as limiting my invention to the specific embodiment illustrated, excepting as it may be limited in the appended claims.

I claim as my invention:

1. In a cable reeling mechanism, a winding drum adapted to have a cable wound thereon, a fluid motor for driving said drum in a direction to wind cable thereon, and means for maintaining a substantially uniform tension on said cable during the winding operation including a pressure line leading to said motor, a plurality of pumps for supplying fluid to said pressure line, and separate valve means associated with each of said pumps, adapted to discharge fluid from its associated pump to the return, upon predetermined loads on said cable, and to permit its associated pump to supply fluid to said pressure line as the tension on said cable decreases.

2. In a cable reeling mechanism, a winding drum adapted to have a cable wound thereon, a fluid motor for driving said drum in a direction to wind cable thereon, and means for maintaining a substantially uniform tension on said cable during the winding operation including a pressure line leading to said motor, a plurality of pumps for supplying fluid to said pressure line, and a separate relief valve associated with each of said pumps, each of said relief valves being set to open at a different pressure in said pressure line, to decrease the volume of fluid supplied to said motor as the tension of said cable increases and to increase the volume of fluid supplied to said motor as the tension on said cable decreases.

3. In a cable reeling mechanism, a winding drum adapted to have a cable wound thereon, a fluid motor for driving said drum in a direction to wind cable thereon, and means for maintaining a substantially uniform tension on said cable during the winding operation including a pressure line leading to said motor, a plurality of pumps for supplying fluid to said pressure line, one of said pumps being directly connected with said pressure line, and a separate relief valve interposed between each of the other of said pumps and said pressure line, each of said relief valves being set to open to discharge fluid to the return at a different pressure in said pressure line, to decrease the volume of fluid supplied to said motor as the tension on said cable increases and to close the line to the return at a different pressure in said pressure line, to increase the volume of fluid supplied to said motor as the tension on said cable decreases.

4. In a cable reeling mechanism, a winding drum adapted to have a cable wound thereon, a fluid motor for driving said drum in a direction to wind cable thereon, and means for maintaining a substantially uniform tension on said cable during the winding operation including a pressure line leading to said motor, a plurality of pumps for supplying fluid to said pressure line, one of said pumps being directly connected with said pressure line, and a separate relief valve interposed between each of the other of said pumps and said pressure line, each of said relief valves being set to open to discharge fluid to the return at a different pressure in said pressure line, to decrease the volume of fluid supplied to said motor as the tension on said cable increases and to close the line to the return at different pressures to increase the volume of fluid supplied to said motor as the tension on said cable decreases, and another relief valve connected with said pressure line, for releasing fluid from said pressure line when the pressure therein exceeds a predetermined value.

5. In combination, a winding drum adapted to be mounted on a vehicle for movement therewith, a cable on said drum adapted to be attached to a fixed point and to be wound on or payed off of said drum, a fluid motor for driving said drum, a pump for supplying fluid under pressure to said motor, said motor being driven by said drum as a pump during the unwinding operation and maintaining tension on said cable during unwinding or stalling of the vehicle, and means for causing said motor to maintain tension on said cable during the unwinding operation, when said motor is being driven as a pump including a pressure relief valve connected in the pressure line from said pump to said motor, to relieve pressure from said pressure line, and said pump being adapted to maintain a back pressure on said motor, to create a drag on said motor when being driven as a pump, sufficient to maintain tension on said cable.

6. In combination, a winding drum adapted to be mounted on a vehicle for movement therewith, a cable on said drum adapted to be attached to a fixed point and to be wound on or payed off of said drum, a fluid motor for driving said drum, said motor being driven as a pump during the unwinding operation and maintaining tension on the cable during unwinding or stalling of the vehicle, and means for supplying fluid under pressure to said motor to cause said motor to drive said drum including a fluid pump, a pressure line connected between said pump and motor, and means for permitting said motor to be driven as a pump during the unwinding operation and for maintaining tension on said cable during the unwinding operation including a relief valve connecting said pressure line with the return and adapted to relieve pressure from said pressure line when said motor is being driven as a pump during the unwinding operation, said pump creating a back pressure on said motor sufficient to create sufficient drag on said motor to maintain tension on said cable during the unwinding operation.

7. In a cable reeling mechanism adapted to supply power to a moving vehicle, a winding drum adapted to have a cable wound thereon, a fluid motor for driving said drum in a direction to wind cable thereon, a fluid pump and a pressure line connecting said pump to said motor, said motor being driven by said winding drum as a pump during the unwinding operation and effecting tension on said cable during unwinding or stalling, and means for relieving pressure from said motor when driven as a pump, but permitting said pump to maintain a back pressure on said motor sufficient to maintain tension on said cable during the unwinding operation.

8. In a cable reeling mechanism adapted to supply power to a moving vehicle, a winding drum adapted to have a cable wound thereon, a fluid motor for driving said drum in a direction to wind cable thereon, a fluid pump and a pressure line connecting said pump to said motor, said motor being driven by said winding drum as a pump during the unwinding operation and effecting tension on said cable during unwinding or stalling, and means for relieving pressure from said motor when driven as a pump, but permitting said pump to maintain a back pressure on said motor sufficient to maintain tension on said cable during the unwinding operation, including a relief valve connected to said pressure line, and operated by suction from said motor, to by-pass fluid from said motor when operating as a pump.

9. In a cable reeling mechanism adapted to supply power to a moving vehicle, a winding drum adapted to have a cable wound thereon, a fluid motor for driving said drum in a direction to wind cable thereon, a fluid pump and a pressure line connecting said pump to said motor, said motor being driven by said winding drum as a pump during the unwinding operation and effecting tension on said cable during unwinding or stalling, a fluid storage tank, a discharge line leading from said motor to said fluid storage tank, a valve connected in said line, said valve including a check valve connected with said pressure line, and adapted to maintain a predetermined pressure therein, when said motor is operating as a motor, and said valve being adapted to relieve pressure from said pressure line when said motor is driven as a pump and being opened to relieve pressure from said pressure line by suction developed by said motor when said motor is being driven as a pump.

10. In a fluid operated cable reeling mechanism mounted on and adapted to supply power to a moving vehicle, a winding drum, a cable attached at its free end to a source of power and adapted to be wound on or payed off of said winding drum as the vehicle moves towards or from the source of power, a fluid motor for driving said winding drum in a direction to wind cable thereon, said motor being driven by said drum as a pump during the unwinding operation and effecting tension on said cable during unwinding and when the vehicle is stationary, and means for maintaining a substantially uniform tension on said cable during the winding operation including a pressure line leading to said motor, a plurality of pumps for supplying fluid to said pressure line, and a separate relief valve associated with each of said pumps, each of said relief valves being set to open at a different pressure in said pressure line to decrease the volume of fluid supplied to said motor as the tension on said cable increases and to increase the volume of fluid supplied to said motor as the tension on said cable decreases.

11. In a fluid operated cable reeling mechanism mounted on and adapted to supply power to a moving vehicle, a winding drum, a cable attached at its free end to a source of power and adapted to be wound on or payed off of said winding drum as the vehicle moves towards or from the source of power, a fluid motor for driving said winding drum in a direction to wind cable thereon, said motor being driven by said drum as a pump during the unwinding operation and effecting tension on said cable during unwinding and when the vehicle is stationary, and means for maintaining a substantially uniform tension on said cable during the winding operation including a pressure line leading to said motor, a plurality of pumps for supplying fluid to said pressure line, one of said pumps being directly connected with said pressure line, and a separate relief valve interposed between each of the other of said pumps and said pressure line, each of said relief valves being set to open to discharge fluid to the return at a different pressure in said pressure line, to decrease the volume of fluid supplied to said motor as the tension on said cable increases and to close the line to the return at a different pressure in said pressure line, to increase the volume of fluid supplied to said motor as the tension on said cable decreases.

12. In a fluid operated cable reeling mechanism mounted on and adapted to supply power to a moving vehicle, a winding drum, a cable attached at its free end to a source of power and adapted to be wound on or payed off of said winding drum as the vehicle moves towards or from the source of power, a fluid motor for driving said winding drum in a direction to wind cable thereon, said motor being driven by said drum as a pump during the unwinding operation and effecting tension on said cable during unwinding and when the vehicle is stationary, and means for maintaining a substantially uniform tension on said cable during the winding operation including a pressure line leading to said motor, a plurality of pumps for supplying fluid to said pressure line, one of said pumps being directly connected with said pressure line, and a separate relief valve interposed between each of the other of said pumps and said pressure line, each of said relief valves being set to open to discharge fluid to the return at a different pressure in said pressure line, to decrease the volume of fluid supplied to said motor as the tension on said cable increases and to close the line to the return at a different pressure line, to increase the volume of fluid supplied to said motor as the tension on said cable decreases, and another relief valve connected with said pressure line, for releasing fluid from said pressure line when the pressure therein exceeds a predetermined value.

13. In a cable reeling mechanism mounted on and adapted to supply power to a moving vehicle, a winding drum adapted to have a cable wound thereon, a fluid motor for driving said drum in a direction to wind cable thereon, said motor being driven by said winding drum as a pump during the unwinding operation and effecting tension on said cable during unwinding or stalling, and means for maintaining a substantially uniform tension on said cable during the winding operation including a pressure line leading to said motor, a plurality of pumps for supplying fluid to said pressure line, separate valve means associated with each of said pumps, adapted to open to discharge fluid to the return upon predetermined torque loads on said winding drum, as the tension on said cable increases, and to permit its associated pump to supply fluid to said pressure line as the tension on said cable decreases, and means causing said motor to maintain tension on said cable during unwinding including means for relieving pressure from said motor when driven as a pump, but permitting said pumps to maintain a back pressure on said motor sufficient to maintain tension on said cable including a relief valve connected with said pressure line and operated by suction from said motor when driven as a pump, to by-pass fluid from said motor when driven by said cable as a pump.

14. In a cable reeling mechanism adapted to supply power to a moving vehicle, a winding drum adapted to have a cable wound thereon, a fluid motor for driving said drum in a direction to wind cable thereon, said motor being driven by said winding drum as a pump during the unwinding operation and effecting tension on said cable during unwinding or stalling, and means for maintaining a substantially uniform tension on said cable during the winding operation including a pressure line leading to said motor, a plurality of pumps for supplying fluid to said pressure line, one of said pumps being directly connected with said pressure line, a separate relief valve interposed between each of the other of said pumps and said pressure line, each of said relief valves being set to open to discharge fluid to the return at a different pressure in said pressure line, to decrease the volume of fluid supplied to said motor as the tension on said cable increases and to close the line to the return at different pressures to increase the volume of fluid supplied to said motor as the tension on said cable decreases, another relief valve connected with said pressure line, for releasing fluid from said pressure line when the pressure therein exceeds a predetermined value, and means causing said motor to maintain tension on said cable during unwinding including means for relieving pressure from said pressure line when said motor is driven as a pump, but permitting said pumps to maintain a back pressure on said motor, sufficient to maintain tension on said cable, including a valve connected in said pressure line ahead of said last mentioned relief valve and operated by suction from said motor when driven as a pump, to by-pass fluid from said motor when being driven by said cable as a pump.

15. In a fluid operated cable reeling mechanism mounted on and adapted to supply power to a moving vehicle, a winding drum, a cable attached at its free end to a source of power and adapted to be wound on or payed off of said winding drum as the vehicle moves towards or from the source of power, a fluid motor for driving said winding drum in a direction to wind cable thereon, said motor being driven by said drum as a pump during the unwinding operation and effecting tension on said cable during unwinding and when the vehicle is stationary, and means for maintaining a substantially uniform tension on said cable during the winding operation including a pressure line leading to said motor, a plurality of pumps for supplying fluid to said pressure line, and a separate relief valve associated with each of said pumps, each of said relief valves being set to open at a different pressure in said pressure line to decrease the volume of fluid supplied to said motor as the tension of said cable increases and to increase the volume of fluid supplied to said motor as the tension of said cable decreases, and means causing said motor to maintain tension on said cable during the unwinding operation including means for relieving pressure from said motor when driven as a pump, but permitting said pumps to maintain enough back pressure on said motor to maintain tension on said cable including a relief valve connecting said pressure line to the return and operated by suction from said motor when driven as a pump, to by-pass fluid from said motor when driven by said cable as a pump.

16. In a fluid operated cable reeling mechanism mounted on and adapted to supply power to a moving vehicle, a winding drum, a cable attached at its free end to a sourse of power and adapted to be wound on or payed off of said winding drum as the vehicle moves towards or from the source of power, a fluid motor for driving said winding drum in a direction to wind cable thereon, said motor being driven by said drum as a pump during the unwinding operation and effecting tension on said cable during unwinding and when the vehicle is stationary, and means for maintaining a substantially uniform tension on said cable during the winding operation including a pressure line leading to said motor, a plurality of pumps for supplying fluid to said pressure line, one of said pumps being directly connected with said pressure line, and a separate relief valve interposed between each of the other of said pumps and said pressure line, each of said relief valves being set to open to discharge fluid to the return at a different pressure in said pressure line, to decrease the volume of fluid supplied to said motor as the tension on said cable increases and to close the line to the return at a different pressure in said pressure line, to increase the volume of fluid supplied to said motor as the tension on said cable decreases, and another relief valve connected with said pressure line, for releasing fluid from said pressure line when the pressure therein exceeds a predetermined value, and means causing said motor to maintain tension on said cable during unwinding including a valve in said pressure line and arranged to by-pass fluid around said last mentioned relief valve, said valve being opened to discharge fluid from said pressure line to the return by suction from said motor when driven as a pump, to permit said motor to be driven as a pump, but to maintain sufficient drag on said motor to prevent free unwinding of said cable from said winding drum.

17. In a cable reel mechanism for a vehicle adapted to be supplied with electric power from a fixed point and adapted to move towards and away from said fixed point, a winding drum mounted on said vehicle for movement therewith, a cable on said drum connected to said fixed point for providing a power connection from said fixed point to said vehicle and adapted to be wound upon or payed away from said drum when said vehicle moves toward or away from said fixed point, a fluid reservoir, a pump for supplying fluid under pressure, a fluid operated motor operated by pressure fluid and drivably connected to said drum and driven as a fluid motor for driving said drum to wind cable thereon and driven as a pump when said vehicle is moving away from said fixed point and paying cable from said drum, a valve for controlling the pressure of said pressure fluid, a second valve having a shiftable valve member therein shiftable in response to flow of fluid when said fluid motor is operating as a pump to partly relieve the pressure so created, to said fluid reservoir, to maintain proper tension on said cable when being payed away from said winding drum.

18. In a cable reel mechanism for a vehicle adapted to be supplied with electric power from a fixed point and adapted to move towards and away from said fixed point, a winding drum mounted on said vehicle for movement therewith, a cable on said drum connected to said fixed point for providing a power connection from said fixed point to said vehicle and adapted to be wound upon or payed away from said drum when said vehicle moves towards or away from said fixed point, a fluid reservoir, a pump for supplying fluid under pressure, a fluid operated motor operated by pressure fluid and drivably connected to said drum and driven as a fluid motor for driving said drum to wind cable thereon and driven as a pump when said vehicle is moving away from said fixed point and paying cable from said drum, and means for by-passing the fluid supplied by said pump and the fluid supplied by said motor when acting as a pump including a valve having a valve member therein shiftable in response to the movement of fluid when said motor is operating as a pump, a fluid passageway in said valve connecting the output from said motor to said fluid reservoir upon movement of said shiftable valve member when acting as a pump, and a restriction in said passageway to the flow of fluid from said motor when acting as a pump for maintaining tension on said cable at a desired value when said drum is paying off cable.

19. In a cable reel mechanism for a mine vehicle adapted to be supplied with electric power from a fixed point and adapted to move towards and away from said fixed point, a winding drum mounted on said vehicle for movement therewith, a cable wound on said drum connected to said fixed point for providing a power connection from said fixed point to said vehicle and adapted to be wound upon or payed away from said drum when said vehicle moves toward or away from said fixed point, a fluid reservoir, a pump for supplying fluid under pressure, a fluid operated mechanism drivably connected to said drum and driven as a fluid motor by pressure fluid supplied by said pump for driving said drum to wind cable thereon and driven by said drum as a pump when said vehicle is moving away from said fixed point and paying cable from said drum, a valve having a shiftable valve member therein shiftable in response to flow of fluid when said fluid motor is operating as a pump, a fluid passageway in said valve connecting the output from said motor when acting as a pump to said fluid reservoir, and a restriction in said passageway to the flow of fluid from said motor when acting as a pump for maintaining tension on said cable at a desired value when said drum is paying off cable.

20. In a cable reel mechanism for a mine vehicle adapted to be supplied with electric power from a fixed point and adapted to move towards and away from said fixed point, a winding drum mounted on said vehicle for movement therewith, a cable wound on said drum connected to said fixed point for providing a power connection from said fixed point to said vehicle and adapted to be wound upon or payed away from said drum when said vehicle moves toward or away from said fixed point, a fluid reservoir, a pump for supplying fluid under pressure, a fluid operated mechanism drivably connected to said drum and driven as a fluid motor by pressure fluid supplied by said pump for driving said drum to wind cable thereon and driven by said drum as a pump when said vehicle is moving away from said fixed point and paying cable from said drum, a valve having a shiftable valve member therein shiftable in response to flow of fluid when said fluid motor is operating as a pump, a fluid passageway in said valve connecting the output from said motor when acting as a pump to said fluid reservoir upon movement of said shiftable valve member, to maintain tension on said cable at a desired value when said drum is paying off cable.

21. In a cable reel mechanism for a mine vehicle adapted to be supplied with electric power from a fixed point and adapted to move towards and away from said fixed point, a winding drum mounted on said vehicle for movement therewith, a cable wound on said drum connected to said fixed point for providing a power connection from said fixed point to said vehicle and adapted to be wound upon or payed away from said drum when said vehicle moves toward or away from said fixed point, a fluid reservoir, a pump for supplying fluid under pressure, a fluid operated mechanism drivably connected to said drum and driven as a fluid motor by pressure fluid supplied by said pump for driving said drum to wind cable thereon and driven by said drum as a pump when said vehicle is moving away from said fixed point and paying cable from said drum, a valve having a shiftable valve member therein shiftable in response to the pressure at the input side of said motor when acting as a pump, a fluid passageway in said valve connecting the output from said motor when acting as a pump to said fluid reservoir upon movement of said shiftable valve member, and a restricting orifice in said passageway to the passage of fluid from said motor when acting as a pump to maintain tension on said cable at a desired value when said drum is paying off cable.

JOSEPH J. SLOMER.

No references cited.